US007961075B2

(12) United States Patent
Kuenzler et al.

(10) Patent No.: US 7,961,075 B2

(45) Date of Patent: Jun. 14, 2011

(54) PROGRAMMABLE LIGHTING UNIT AND REMOTE CONTROL FOR A PROGRAMMABLE LIGHTING UNIT

(75) Inventors: Udo Kuenzler, Karlsbad (DE); Markus Salm, Heusweiler (DE); Oliver Klee, Germersheim (DE); Walter Englert, Burgrieden (DE)

(73) Assignee: GLP German Light Products GmbH, Karlsbad (DE)

( * ) Notice: Subject to any disclaimer, the term of this patent is extended or adjusted under 35 U.S.C. 154(b) by 1021 days.

(21) Appl. No.: 11/755,696

(22) Filed: May 30, 2007

(65) Prior Publication Data

US 2008/0297070 A1 Dec. 4, 2008

(51) Int. Cl.
*G05B 23/02* (2006.01)
*H05B 37/02* (2006.01)

(52) U.S. Cl. ......... 340/3.52; 340/3.1; 315/291; 315/307

(58) Field of Classification Search ............. 340/825.69, 340/825.71, 3.1, 3.52; 315/291, 307
See application file for complete search history.

(56) References Cited

U.S. PATENT DOCUMENTS

| | | | | |
|---|---|---|---|---|
| 6,211,626 | B1 * | 4/2001 | Lys et al. | 315/291 |
| 7,163,302 | B2 * | 1/2007 | Pohlert et al. | 362/11 |
| 7,167,106 | B2 * | 1/2007 | Haase | 340/909 |
| 2002/0020595 | A1 | 2/2002 | Adamek et al. | |
| 2002/0145394 | A1 | 10/2002 | Morgan et al. | |
| 2003/0112148 | A1 | 6/2003 | Belliveau | |
| 2003/0222587 | A1 * | 12/2003 | Dowling et al. | 315/149 |
| 2004/0032226 | A1 | 2/2004 | Lys | |
| 2007/0268151 | A1 | 11/2007 | Juen et al. | |

* cited by examiner

*Primary Examiner* — Daniel Wu
*Assistant Examiner* — Mark Rushing
(74) *Attorney, Agent, or Firm* — Michael A. Glenn; Glenn Patent Group

(57) ABSTRACT

A programmable lighting unit includes a radio interface to be remote controlled by a radio remote control. In particular, the remote control sends parameter data which is supplied to a parameter adjuster in the programmable lighting unit which programs the parameter data such that a controller of the programmable lighting unit controls a controllable lamp dependent on the parameter data. In particular, the controller is adapted to be programmed using the one or the multiple parameters such that a reaction by the controller to the control data depends on the one or the multiple parameters.

20 Claims, 3 Drawing Sheets

PROGRAMMABLE LIGHTING UNIT AND REMOTE CONTROL FOR A PROGRAMMABLE LIGHTING UNIT

TECHNICAL FIELD

The present invention relates to programmable lighting units, and particularly to programmable lighting units employable in the field of events.

BACKGROUND

DE102004007057 discloses a concept of transmitting a DMX-512 signal for control of lighting bodies. Particularly, a DMX signal is created at a control console at a first location and compressed via a transmitting modem and modulated onto the usual power supply signal. The compressed DMX signal is then transmitted via the normal power supply network to a lighting system at a distant location. There, a receiving modem is provided which extracts the DMX signal and controls a lighting system with it. Alternatively, the transmission from the control console at the first location to the lighting system at the second location can take place wirelessly such that a radio transmitting modem is provided at the control console and that a radio receiving modem is provided at the distant location where the lighting system is located. Particularly, signals for controlling the color of the lighting body or signals for panning and/or rotating (PAN/TILT) are transmitted to the lighting body to activate one or multiple motors starting from these signals to direct the spot of the lighting body to a desired place.

Particularly, lighting bodies in the field of events or in the sector of stage lighting are often put up, taken down and put up again at another place. Furthermore, recent intelligent programmable lighting units have a high functionality and depending on form of design a high price. On the other hand, an organizer does not necessarily have to own a great number of programmable lighting units. Instead, the number of rental service providers, which lend out programmable lighting units from event to event as needed, increases.

Therefore, it can no longer be assumed that a lighting unit, once it has been put up, will remain at this place forever. Instead, exactly the opposite is becoming reality, namely that a lighting unit is put up at a place, then an event takes place, for example, for one or more days and weeks, and then the lighting unit is taken down again, transported to another location and put up there again for another event.

On the other hand, many intelligent devices used in the sector of stage lighting can be addressed by means of serial data protocols, to be able to transmit the numerous control signals, for example, concerning the brightness, the color, the direction of the spot, etc., to the lighting unit. In particular, a data line is piped hereby from the control console to the first device, then to the second device, then to the third, and so on. In order to achieve this, a data address must be assigned to the individual devices such that each device extracts the part of the data protocol or the channel which contains the data that is intended for the corresponding device.

A possibility for initializing the devices, i.e., to perform a set up for the devices, is using the DIP switches at the back of each device. This procedure, however, is complicated because the DIP switches are small and sensitive and can therefore be damaged due to frequent rough handling in the event sector. Additionally, the person adjusting the DIP switches had to know the binary code.

An alternative possibility is performing this set up initialization by displays and buttons of which there are often four which have the functions Yes/No/More/Less. Alternatively, there are rotation encoders. With them operation has become more comfortable. But now the problem is that power supply is needed for the setting of the devices, i.e., to supply the displays and buttons or the rotation encoders with current. It is especially this supply which is often not available for systems which are put up in alternate halls, like systems which are "on tour" together with a band. In most cases, these devices must be hung up first, while the mobile power supply is installed only later on and the supply of the hall is too weak or turned off. Once the devices have been hung up under the ceiling in a concert hall, adjusting becomes a task for acrobats.

An alternative possibility is improving the adjustment by means of accumulator-buffered systems. This does not render the handling independent of voltage, but has a few major disadvantages. An accumulator and an elaborated charging electronics are necessary. Accumulators contain problematic substances as, for example, cadmium, and are therefore critical. Additionally, accumulators only have a limited lifetime and they further have the problem of self discharge. This means, when the device is not operated regularly, the accumulator will be empty one day or the other and will no longer be of use. This can occur particularly in the rental sector when a lighting unit has not been lent out for a longer period. In case of a supply with an accumulator the power electronics of a remote controlled lighting unit must be decoupled elaborately, for example for motor drives and control electronics, because the accumulator would rapidly be empty when having to supply the complete device with current. On the other hand, when supplying the whole device with current by the accumulator, the accumulator would be unnecessarily big and heavy. When the electronics for the controller and for normal operation of the lighting unit are decoupled, a data address is adjustable but a functional test is still not viable because the device itself does not run which is why the functionality and/or correctness of the adjustment cannot be tested.

SUMMARY

According to an embodiment, a programmable lighting unit may have: a radio interface for receiving parameter data; a parameter adjustment means for adjusting one or multiple parameters of the programmable lighting unit using the parameter data; a controllable lamp for emitting light; a control input for receiving control data for the controllable lamp; and a controller for controlling the controllable lamp using the control data, wherein the controller is adapted to be programmed using the parameters such that a reaction by the controller to the control data depends on the one or the multiple parameters.

According to another embodiment, a method for operating a programmable lighting unit may have the steps of: receiving parameter data via a radio interface; adjusting one or multiple parameters of the programmable lighting unit using the parameter data; emitting light via a controllable lamp; receiving control data for the controllable lamp; and controlling the controllable lamp using the control data using the one or the multiple parameters, wherein a reaction to control data in the step of controlling depends on the one or the multiple parameters.

According to another embodiment, a remote control for a programmable lighting unit with a controllable lamp may have: an input interface for inputting parameter data for the programmable lighting unit, wherein the parameter data includes one or multiple parameters for the programmable lighting unit; and a radio interface for sending the parameter data to the programmable lighting unit or to multiple programmable lighting units, wherein the parameter data is such that a reaction by the programmable lighting unit to control data depends on the parameter data.

According to another embodiment, a method for operating a remote control for a programmable lighting unit may have the steps of: receiving an input of parameter data for the programmable lighting unit; and sending the parameter data to the programmable lighting unit or to multiple programmable lighting units in a radio range of the remote control, wherein the parameter data is such that a reaction by the programmable lighting unit to control data depends on the parameter data.

According to another embodiment, a computer program with a program code for executing the methods as mentioned above when the computer program runs on a computer.

The present invention is based on the fact that parameters for programmable lighting units which relate to the basic adjustment of programmable lighting units or the set up of programmable lighting units, are adjusted via a radio remote control. Thus it is achieved that the programmable lighting units can easily be installed at the final position where they are to operate, and that the programmable lighting units can also be connected to the usual power supply, and that, nevertheless, a basic programming of the lighting unit is easily permitted without acrobats being necessary to get to the lighting units.

Instead, a parameter adjustment of the programmable lighting unit is achieved inventively by radio remote control. Parameters which are adjusted by radio remote control include an indication to a channel in a multi-channel access method, as for example an identification of a time slot, an identification of a frequency carrier, or an identification of a specific code in a time-division multiplexing, frequency-division multiplexing or code-division multiplexing process. A parameter adjustable by radio remote control can also be a data address or a start address with which a programmable lighting unit is addressed, wherein this start address or data address for a programmable lighting unit determines which data of a data protocol which is sent to multiple different lighting units is to be received and interpreted by a specific addressed lighting unit and which data is to be ignored by a specific lighting unit because the data is intended for other lighting units with other data addresses or start addresses.

Advantageously, multiple lighting units cooperate with a radio remote control in a master-slave-operation, the radio remote control being the master and the individual lighting units logging on as slaves at the radio remote control to obtain their data addresses and/or the indication to the channel in a multi-channel access method. In embodiments this is done, for example, by each lighting unit sending a unique identification of, for example, each serial number or another information to the radio remote control and being assigned, in connection with this identification, an address and/or a channel over which communicating with the lighting unit becomes possible in the future, in order for the lighting unit to receive the usual control signals. A controller for controlling the programmable lighting unit uses this normal control data. However, the interpretation of this control data by the controller depends on which parameters are adjusted via the described radio interface and on how the parameters have been adjusted. Thus, according to the invention, parameters of the device are adjusted by remote control, i.e., such adjustments which determine how the programmable lighting unit reacts to control data later on.

BRIEF DESCRIPTIONS OF THE DRAWING

Embodiments of the present invention will be described in detail in what follows with relation to the accompanied drawings, in which.

DETAILED DESCRIPTION

Figure 4:
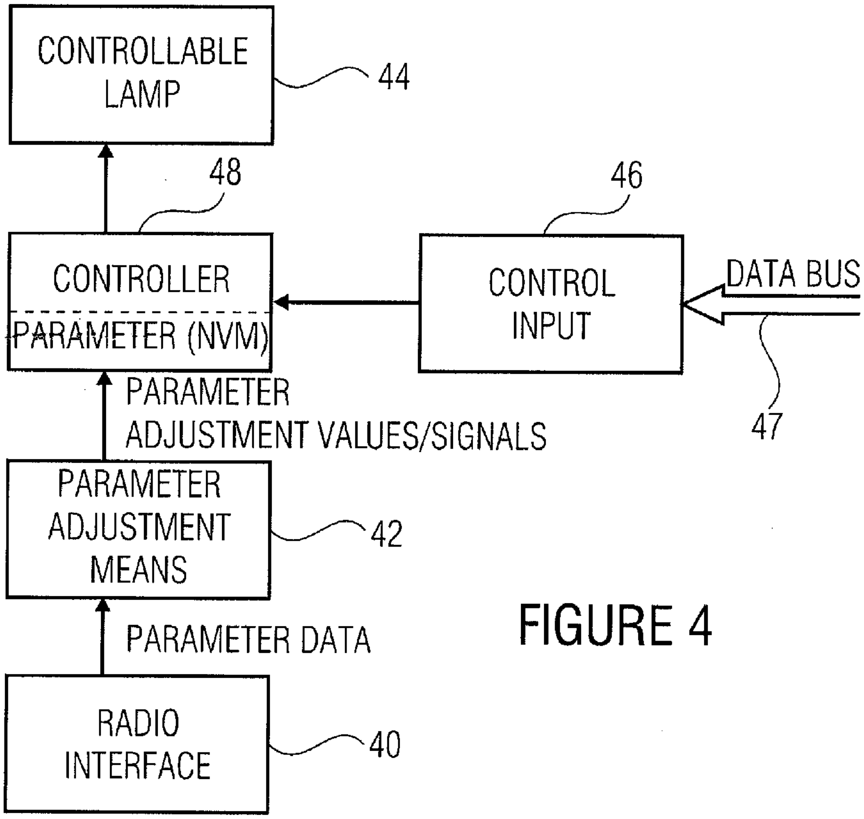
FIG. 4 is a more detailed illustration of the functional blocks of a programmable lighting unit of FIG. 1.

FIG. 4 shows a programmable lighting unit according to the present invention. The programmable lighting unit includes an interface 40 for receiving parameter data. The parameter data which is received by the radio interface 40 is supplied to a parameter adjustment means 42 adapted to adjust one or multiple parameters of the programmable lighting unit using the received parameter data. The programmable lighting unit of FIG. 4 further includes a controllable lamp 44 for emitting light. Further, a control input 46 is provided which, according to the implementation, is advantageously implemented to be separate from the radio interface 40, wherein control date for the controllable lamp 44 is received via the control input 46. The control data can be supplied via a data bus 47 or over a radio interface as well, when the control input 46 is implemented as a radio interface or when the common radio interface is used, but then in the radio signal the control data is separated from the parameter data. The control input 46 is adapted to supply control data received from the data bus 47 to a controller 48 adapted to control the controllable lamp 44 using the control data obtained from the control input 46.

Further, the controller 48 is adapted to be programmed using the parameters derived from the parameter adjustment means 42 such that a reaction by the controller 48 to the control data depends on the one or multiple parameters in the parameter data as received from the radio interface 40. For this, the controller 48 particularly includes a non-volatile memory (NVM), for example. Such non-volatile memories are programmed by the parameter adjustment means 42. Possibilities for non-volatile storage are providing a magnetic memory or any other storage medium which does not necessarily have to be a semiconductor memory, but may be any kind of memory which can be written to by the parameter adjustment means 42 and which retains its values even when the power supply of the programmable lighting unit shown in FIG. 4 is disconnected.

The controllable lamp 44 can be a usual lamp or can include LEDs. Particularly, even multi-colored LEDs can be provided. Further, also LEDs and additional normal incandescent lights or alternative lamps, such as mercury vapor lamps, etc., can be provided.

In embodiments the controllable lamp 44 further includes one or multiple motors for being able to move the lamp in one or multiple dimensions. These movements are also referred to as panning or tilting. The controllable lamp 44 is advantageously implemented to have three illuminants of different colors, such as red (R), green (G) and blue (B), to span a complete RGB color space. All colors can then be adjusted to different brightnesses of individual illuminants by the control signal received from the data bus 47 (FIG. 4). Further, signals are supplied over the data bus 47 to pan and/or tilt the controllable lamp 44.

Figure 1:
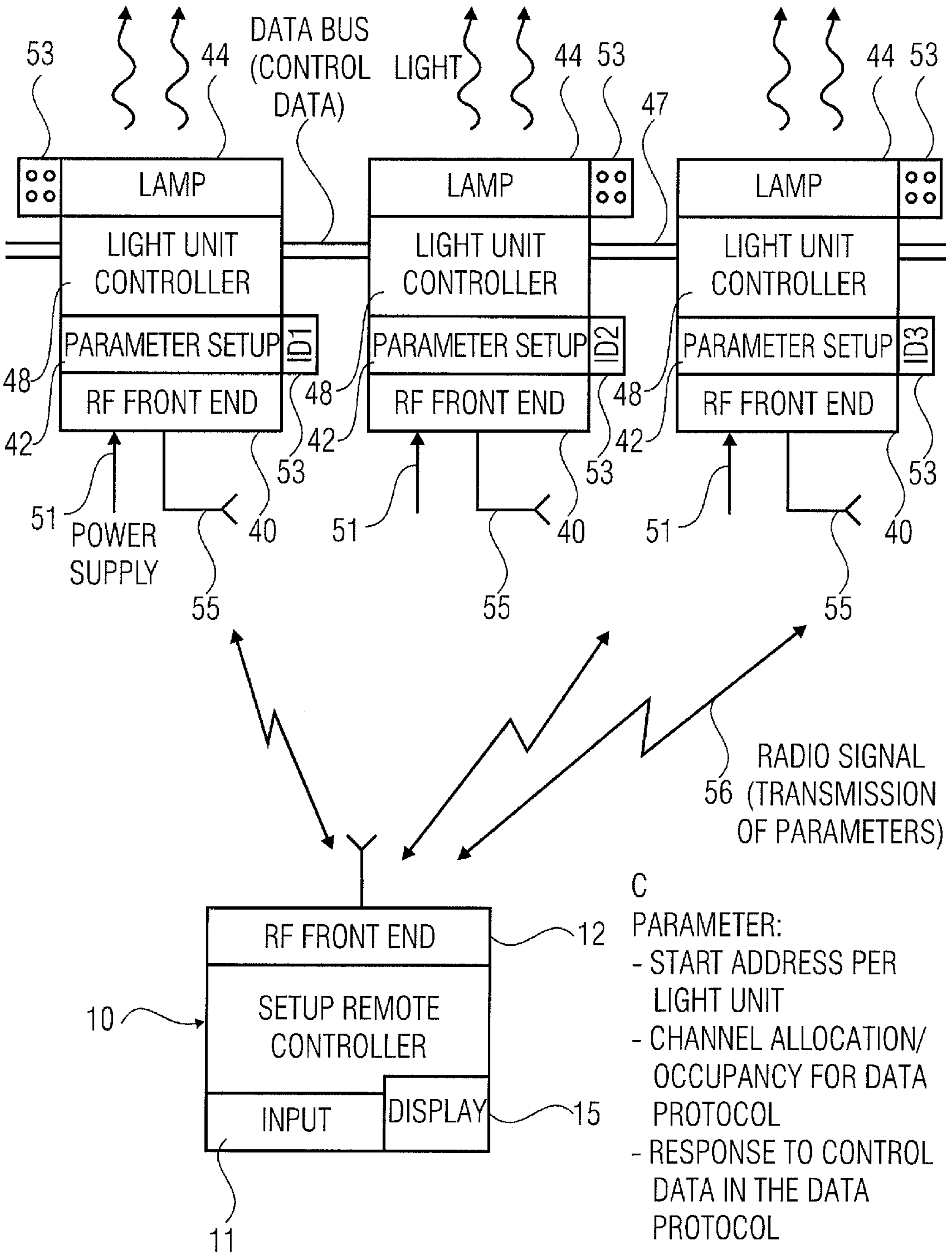
FIG. 1 is a schematic illustration of a plurality of lighting units which are adjustable by a radio remote control.

FIG. 1 shows a scenario in which three programmable lighting units which in this example are built alike are in the radio range of a remote control 10. The remote control 10, which is also referred to as set up remote control (set up=adjustment or initialization), includes an input terminal 11 for inputting parameter data for one or multiple programmable lighting units. The remote control further includes a radio interface and/or an RF front end 12 for sending the parameter data to one or multiple programmable lighting units, wherein the parameter data is selected such that a reaction by the programmable lighting units to control data depends on the parameter data.

In the embodiment shown in FIG. 1 the RF front end 12 of the remote control 10 thus does not send control data. Instead, the control data is supplied to the individual programmable lighting units via a data bus 47. According to implementation, the data bus 47 can be wired, or the data bus 47 can be accomplished via a power supply line, wherein, however, this case is not shown in FIG. 1. Instead, each programmable lighting unit has a power supply 51 separated from the data bus 47.

The programmable lighting units do not need an accumulator for the programming of parameter data. Instead, the lighting units can be put up at the intended location of operation before being initialized at all or before having received a set up, wherein the place at which the lighting unit can be put up is a ceiling, a pole or a wall, for example. This is schematically indicated in FIG. 1 by mounting means 52, wherein one mounting means 52 is provided for each lighting unit so that it can be mounted to the desired place, such as at the wall, at the ceiling or at a carrier.

Further, in the embodiment shown in FIG. 1 each programmable lighting unit is allocated an individual identification 53 which can be, for example, a unique serial number of the lighting unit, or a random number which the lighting unit can choose for itself and which serves for identifying the lighting unit such that the remote control 10 is able to communicate with each lighting unit to the effect that a lighting unit is allocated an indication to a predetermined channel in a multichannel access method and/or a start address or a data address such that each lighting unit can find out the data intended for it from the sent frame. The communication between an RF front end 12 and a respective antenna 55 of a programmable lighting unit takes place via radio waves 56 such that the adjustment of a programmable lighting unit, once the lighting unit is built in, can then be accomplished without problems, without the one adjusting the lamp having to touch it directly or, for example, having to climb up a scaffolding.

The parameters sent by the remote control 15 include a start address per lighting unit, a channel assignment or channel occupancy for a data protocol, a response to control data in the data protocol, etc. Particularly, a parameter can also include an assignment of brightness signals, chromaticities, pan or tilt data such that data that is actually provided as pan data is interpreted, due to a parameter adjustment, without problems by a programmable lighting unit as tilt data. Similarly, when for example an RGB light is provided, a control signal which was originally intended for the R channel can easily be interpreted, due to a parameter adjustment, by the programmable lighting unit as control signal for G or B.

As shown in FIG. 1, the remote control can further have a display 13 via which parameters to be transmitted or other data is displayed to the user of the remote control.

The present invention is advantageous in that, during the put up phase of an event, the programmable lighting unit no longer has to be addressed and/or tested while still at the ground, but after it is mounted to its location of operation, usually under the ceiling, by means of the mounting means 53 (FIG. 1). This is achieved by the remote control which communicates wirelessly with the RF front end (radio interface) 40 of each programmable lighting unit. Advantageously, the remote control is implemented in the form of a wristwatch so that the user has the functionality of the remote control in the wristwatch and does not have to carry a further tool or a remote control.

Inventively, the programmable lighting units can comfortably be operated from the ground by remote control although the lighting unit is already hung up at its final destination. A further advantage lies in the fact that the lighting unit which is hung up at its final destination is supplied with its usual power supply voltage which ensures that alongside the normal power supply for the lamp also the power supply for the configuration, that is the parameter adjustment (parameter set up), works virtually automatically such that neither accumulators nor batteries nor a laborious connecting, programming, disconnecting and recurrent packaging is necessary.

Advantageously, the data connection with the remote control is bi-directional. This permits reading out data, such as temperatures, reset failures, lifetime of a lamp and specific data errors, from the programmable lighting units for the purpose of a diagnosis. Therefore, it can happen that, due to bad cable, wrong laying or strong interference fields on the data line, so called "wave reflections" develop which are known in particular for the protocol DXM512. This error can be detected by connecting an analyzer to various locations of the data line and controlling the actual incoming data package. However, it is problematic herein that this can only be accomplished by climbing up to the lamp and connecting the device to the lamp there.

Inventively, however, a data analysis is carried out on the remote control by means of the bi-directional data connection between the remote control and the programmable lighting unit, for example, on the display of the remote control or via an extended functionality of the remote control which is, for example, provided with a micro controller.

A further functionality of the invention is achieving the possibility for calibration of colors which is offered by some programmable lighting units but which up to now had to take place before the putting up, by the inventive parameter adjustment taking place after the putting up. Further, the calibration via radio interface solves the problem of sometimes not being able to see the device from the place from which data is fed in. Also this problem is thus eliminated with the inventive parameter adjustment via radio interface.

In specific embodiments the programmable lighting unit can be remote controlled completely via a radio interface such that the normal data bus 47 is also implemented via a radio interface. In this case, the RF front end 40 of each programmable lighting unit is used twice. However, a channel separation takes place in the RF front end to extract the parameter data from the radio signal and use it for the parameter adjustment on the one hand, and to extract the control data from the radio signal and supply it to the lighting unit controller 48 on the other hand. Such an implementation is advantageous when the programmable lighting units are arranged far away from each other, for example, when a river is illuminated from both banks. Then the programmable lighting unit is implemented to receive a complete DMX 512 universe signal with 512 channels by radio via its radio interface. Starting from this receiving device, the data can then be passed through serially, for example, via cable or further radio interfaces, to further devices, but it is advantageous that these further devices are, by means of a usual data bus line 47 that is coupled to power, connected to the programmable lighting unit which has the radio receiver and which feeds the data bus that is coupled to power. In this case, the remote control would no longer be implemented as a watch but as a table top or rack device, because the entire control of the lighting units and not only the parameter data feeding has to be performed by the remote control.

So, device parameters are adjusted inventively by remote control, i.e., adjustments which determine how the device reacts to control data later on when the device is in operation. Thus, the invention is not primarily aimed at devices being installed in some fixed position, such as libraries, museums, restaurants, etc., because here the parameters of the device are usually have to be adjusted only once, i.e., during the installation of the devices. The normal case to which the invention mainly relates falls into the business sector of events. Here, for example, a putting up of the devices is carried out at alternate locations during a tour, which is in different stadiums/halls, because the necessary equipment is usually not available at these locations. Ideally, the position of an event is thus an empty hall with a correspondingly strong power supply to supply the lamps of the programmable lighting units sufficiently. All other equipment necessary for the event is brought along by a service provider. When the service provider equips an event for which, for example, 30 device are needed, but he himself owns only 20 devices of whom 10 pieces previously have been at the event X and 10 pieces at the event Y, he uses his 20 devices and rents further 10 devices from a rental service. The organizer then has 30 devices of completely identical design which may have undergone three or more totally different pre-programmings or parameter adjustments.

Thus, these devices react totally different to payload data sent later on and, of course, also have data addresses and/or start addresses and/or indications to a channel in a multiple-access method which are not synchronized. Without the invention all device would have to be matched prior to the putting up so that afterward the parameters of all devices are equal. This would be accomplished on the side of the service provider, which means that the device has to be taken out of the carrier box, has to be connected, has to be turned on and programmed, has to be turned off, cables have to be disconnected and has to be packed again. It is apparent that this involves a lot of time which increases the costs considerably.

Alternatively, such a programming can also take place before the putting up at the location of the event. However, this means that the devices have to be brought into the hall in its transport boxes, a temporary power supply has to be organized, the devices have to be taken out of the transport boxes, are to be connected, are to be turned on, are to be programmed accordingly and turned off, the cables have to be disconnected, and that only then the devices are hung up for operation, but now readily programmed.

The latter variation saves having to recurrently packaging of the devices. However, with this variation laying of a temporary power supply is necessary which is needed exclusively to perform these programmings. Therefore, the corresponding space is needed at the location of the event which is normally rare due to the constructions built up simultaneously. Also, when the variation with a battery is used, each device still has to be programmed individually before being put up.

Inventively, this programming in advance becomes redundant. The devices are mounted as are, delivered from the preceding events, at its final position and are also connected to the power supply with which they are later operated during the event. Naturally, a predisposition is that the devices are not completely out of order and have to be repaired.

Now the parameterizing is carried out by means of the remote control without having to connect the devices provisionally beforehand and having to put them into operation. Thus, this process is performed at a later time than was the case so far. This saves the recurrent packaging at the storehouse and/or the effort involved with the installation for the temporary power supply.

Another advantage lies in the fact that inventively the programming does not have to be performed individually at each device. Instead, a simultaneous programming of multiple devices is permitted inventively. When, for example, devices are to be reset to their settings made by the manufacturer first, before special data addresses are then assigned, this means a simple programming effort compared to, for example, 200 individual programming activities for 200 different lamps. The saving of time here is tremendous.

Parameters which should not be identical for all devices as for example the start address and/or the indication to the specific channel in a multi-channel access method, can be adjusted automatically by means of the system. At this, the remote control is the master, while all programmable lighting units are slaves in the radio network. The slaves automatically log on at the master, the user selects a sequence of the devices, and the devices are then assigned its starting addresses automatically, which also leads to an enormous saving of time. This is accomplished by a corresponding assignment software or assignment hardware implemented on the remote control.

Figure 2:
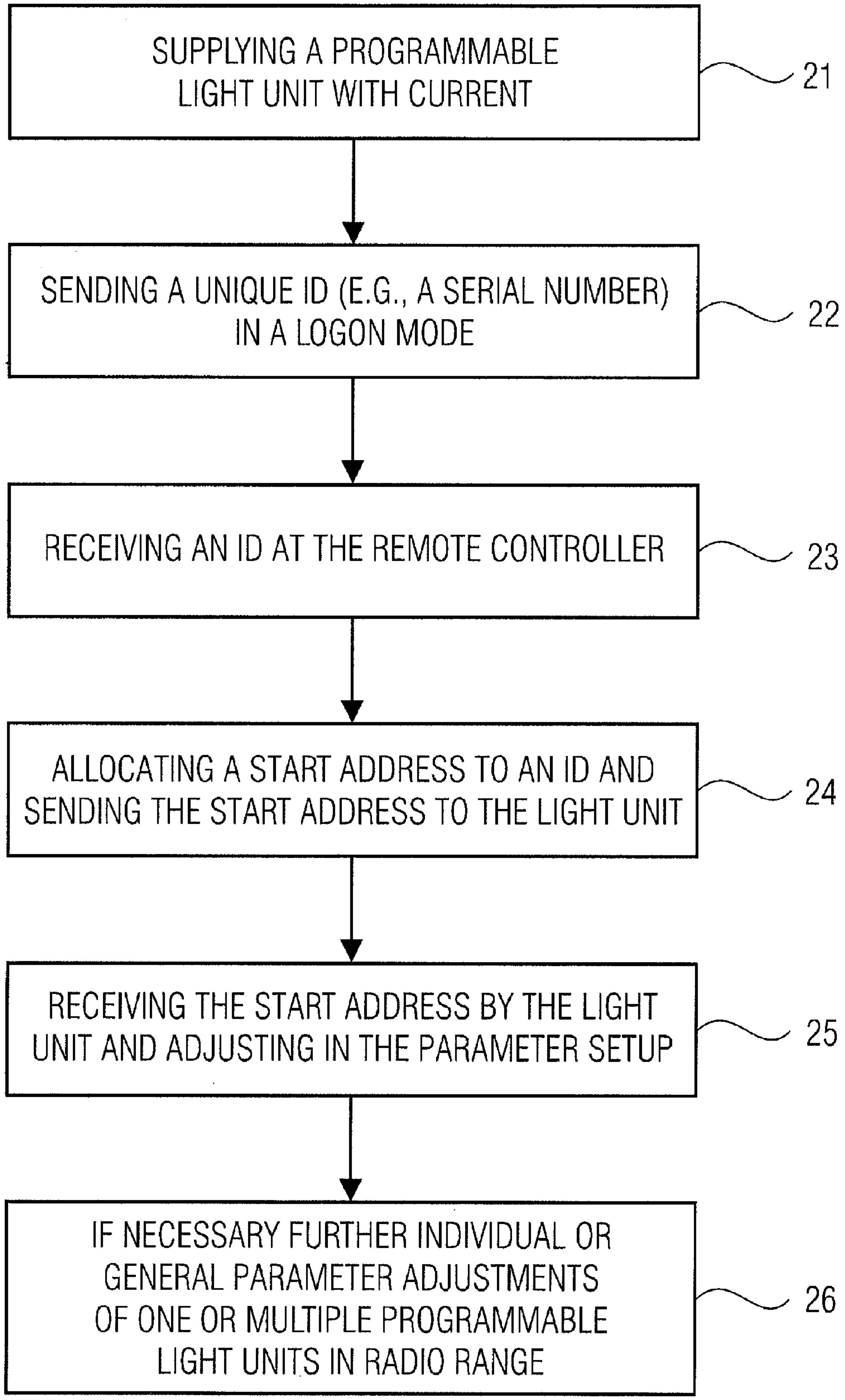
FIG. 2 shows a flow chart of an initialization sequence for an adjustment of parameters.

FIG. 2 shows a flow chart of the programming and/or parameterizing of programmable lighting units as it is permitted by the invention. In a step 20, one programmable lighting unit is supplied or numerous programmable lighting units are supplied with current after having been put up at their places. Thereafter, in a step 22, a lighting unit sends a unique ID, for example, a serial number or a selected random number, in a log-on mode to the remote control. The remote control receives this ID of the programmable lighting unit in a step 23. In a step 24, the remote control then allocates a start address to the ID and thus to the programmable lighting unit to which this ID belongs, and sends this start address to the lighting unit. Of course, all lighting units that are active at a same time receive the signal sent out in step 24. However, due to the fact that, for example, the ID of the lighting unit is contained in the radio signal together with the start address, the lighting unit exactly knows which start address is assigned to it, i.e., the start address which is assigned to its own ID.

Alternatively, the programming of the individual lighting units can also be accomplished without a lighting unit-specific ID, for example, when it is provided for that the programmable lighting units are turned on successively so that already by the sequence of lighting units being turned on the remote control only communicates with a specific programmable lighting unit at a time. Thus, only one lighting unit newly turned on is in the log-on mode to receive and implement the start address just sent out by the remote control and/or the indication to a channel in a multi-channel scenario then sent out by the remote control. In a step 25, the lighting unit then receives the start address and adjusts the start address and/or the indication to a channel in a multi-channel access method in its parameter set up. Afterwards, further individual or general parameter adjustments of one or multiple programmable lighting units in a radio range can be accomplished, as is illustrated in a step 26. These further individual or general parameter adjustments are the response of a programmable lighting unit to control data in the data protocol, calibrations of colors, or other control parameters which determine how a programmable lighting unit reacts to control data.

Figure 3:
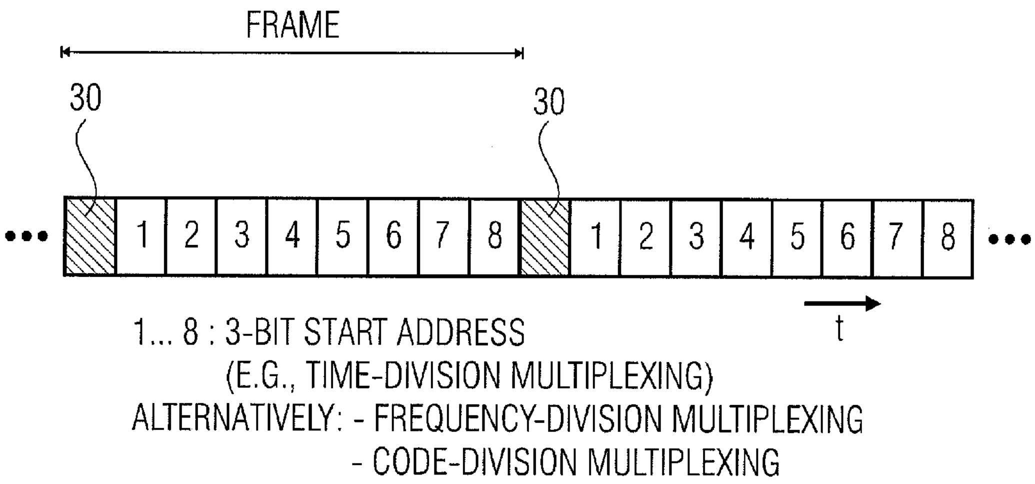
FIG. 3 shows an example of a time-division multiplex protocol with a frame structure and a 3-bit start address for addressing eight different programmable lighting units.

FIG. 3 shows by way of example a serial data protocol with eight times slots 1, 2, 3, 4, 5, 6, 7, 8 with which eight different programmable lighting units can be addressed, for example. A 3-bit start address will then be assigned to each programmable lighting unit via the radio interface such that each programmable lighting unit knows, starting from a synchronization field 30 which the programmable lighting unit is predetermined to know according to a predetermined data transmission protocol, in which time slot it finds the data intended for it. Alternative methods with frequency-division multiplexing or code-division multiplexing can also be implemented correspondingly, wherein the individual channel assigned to a programmable lighting unit is identified via a start address which, in turn, selects the frequency carrier or the sequence of the code a programmable lighting unit needs to extract the data intended for it from a frame. Accordingly, 16 programmable lighting units can be addressed with a 4-bit start address, and 32 programmable lighting units can be addressed with a 5-bit start address, etc.

Depending on the circumstances, the inventive method can be implemented in either hardware or software. The implementation may be on a digital storage medium, in particular on a disc or a CD having control signals which may be read out electronically, which can cooperate with a programmable computer system such that the corresponding method will be executed. Generally, the invention thus also is in a computer program product having a program code stored on a machine-readable carrier for performing the inventive method when the computer program product runs on a computer. Put differently, the invention may thus also be realized as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A programmable lighting unit comprising:

a radio interface for receiving parameter data;

a parameter adjuster for adjusting one or multiple parameters of the programmable lighting unit using the parameter data;

a controllable lamp for emitting light;

a control input for receiving control data for the controllable lamp; and a controller for controlling the controllable lamp using the control data, wherein the controller is adapted to be programmed using the parameters such that a reaction by the controller to the control data depends on the one or the multiple parameters, wherein the controller has a unique ID assigned to the programmable lighting unit, wherein the controller is adapted to send the unique ID to a distant remote control in a log-on operation, wherein the programmable lighting unit is adapted to receive several signals from the remote control, wherein every signal comprises a unique ID of one of the programmable lighting units and a start address allocated to the unique ID or an indication to an allocated channel allocated to the unique ID in a multiple-access method, and wherein the programmable lighting unit is adapted to use only that start address as its own start address or only that allocated channel in a multiple-access method that is allocated to the unique ID of the programmable lighting unit.

2. The programmable lighting unit of claim 1, wherein the control input is an interface for a control cable or an interface for a supply line onto which the control data is modulated.

3. The programmable lighting unit of claim 1, wherein the controller is adapted to respond to a predefined data transmission protocol, wherein the parameter data includes a unique indication to a time slot in a time-division multiplex protocol, a unique indication to a carrier frequency in a frequency-division multiplex protocol, or an indication to a sequence of a code in a code-division multiplex protocol allocated to the programmable lighting unit, and wherein the unique indicia is different from one programmable lighting unit to another programmable lighting unit.

4. The programmable lighting unit of claim 1, wherein the parameter is a start address of a serial data protocol.

5. The programmable lighting unit of claim 1, wherein the parameter data includes a parameter defining a dynamic range for control signals, wherein the controller is adapted to perform a conversion to lamp output signals based on the dynamic range defined by the parameter.

6. The programmable lighting unit of claim 1, wherein the controllable lamp comprises illuminants of different colors, wherein a parameter includes an assignment of a control channel to a specific color.

7. The programmable lighting unit of claim 1, wherein the controller is adapted to start a log-on operation in response to a predefined event.

8. The programmable lighting unit of claim 7, wherein the controller is adapted to start the log-on operation in response to turning on the programmable lighting unit, receiving a synchronization signal via radio from a remote control, in response to an absolute or relative time, or in response to a predefined data word received via the control input.

9. The programmable lighting unit of claim 1, wherein the control input is implemented to be separate from the radio interface.

10. The programmable lighting unit of claim 1, which is adapted to use current provided via an external power supply for the parameter adjustments.

11. The programmable lighting unit of one of the preceding claims, further comprising:

a mounting means for mounting the programmable lighting unit to a wall, to a column, or to a ceiling of a room.

12. The programmable lighting unit of claim 1, wherein the controllable lamp is controllable relating to its direction of lighting, lighting color, color temperature, and wherein control signals are received via the control input to control the direction of lighting, lighting color or color temperature.

13. A method for operating a programmable lighting unit, comprising:

receiving parameter data via a radio interface;

adjusting one or multiple parameters of the programmable lighting unit using the parameter data;

emitting light via a controllable lamp;

receiving control data for the controllable lamp; and controlling the controllable lamp using the control data using the one or the multiple parameters, wherein a reaction to control data in the step of controlling depends on the one or the multiple parameters, wherein the programmable lighting unit has a unique ID assigned to the programmable lighting unit, wherein, in a log-on operation, the unique ID is sent to a distant remote control, wherein several signals are received from the remote control, wherein every signal comprises a unique ID of one of the programmable lighting units and a start address allocated to the unique ID or an indication to an allocated channel allocated to the unique ID in a multiple-access method, and wherein the programmable lighting unit uses only that start address as its own start address or only that allocated channel in a multiple-access method that is allocated to the unique ID of the programmable lighting unit.

14. A remote control for a programmable lighting unit with a controllable lamp, comprising:

an input interface for inputting parameter data for the programmable lighting unit, wherein the parameter data includes one or multiple parameters for the programmable lighting unit;

a radio interface for sending the parameter data to the programmable lighting unit or to multiple programmable lighting units, wherein the parameter data is such that a reaction by the programmable lighting unit to control data depends on the parameter data; and a controller that is adapted to receive, in a log-on operation, a log-on of at least two programmable lighting units in radio range of the remote control, wherein a log-on of a programmable lighting unit comprises an ID uniquely allocated to the programmable lighting unit, in order to allocate to every uniquely allocated ID an own start address or an indication to a channel in a multiple-access method, to send out a signal for every received ID that comprises an ID and the start address allocated to the ID or the indication to a channel allocated to the ID in a multiple-access method.

15. The remote control of claim 14, which further comprises a controller adapted to cause a reset of a parameter adjustment to a basic parameter adjustment by a predetermined command, wherein the basic parameter adjustment is the same for all programmable lighting units in the radio range.

16. A method for operating a remote control for a programmable lighting unit, comprising:

receiving an input of parameter data for the programmable lighting unit; and sending the parameter data to the programmable lighting unit or to multiple programmable lighting units in a radio range of the remote control, wherein the parameter data is such that a reaction by the programmable lighting unit to control data depends on the parameter data, wherein, in a log-on operation, a log-on of at least two programmable lighting units is received in radio range of the remote control, wherein a log-on operation of a programmable lighting unit comprises an ID uniquely allocated to the programmable lighting unit, wherein an own start address or an indication to a channel in a multiple-access method is allocated to every uniquely allocated ID, and wherein a signal is sent out for every received ID that comprises an ID and the start address allocated to the ID or the indication to a channel allocated to the ID in a multiple-access method.

17. A computer program stored on a non-transitory computer storage medium comprising a program code for executing the method for operating a programmable lighting unit, the method comprising: receiving parameter data via a radio interface; adjusting one or multiple parameters of the programmable lighting unit using the parameter data; emitting light via a controllable lamp; receiving control data for the controllable lamp; and controlling the controllable lamp using the control data using the one or the multiple parameters, wherein a reaction to control data in the step of controlling depends on the one or the multiple parameters, wherein the programmable lighting unit has a unique ID assigned to the programmable lighting unit, wherein, in a log-on operation, the unique ID is sent to a distant remote control, wherein several signals are received from the remote control, wherein every signal comprises a unique ID of one of the programmable lighting units and a start address allocated to the unique ID or an indication to an allocated channel allocated to the unique ID in a multiple-access method, and wherein the programmable lighting unit uses only that start address as its own start address or only that allocated channel in a multiple-access method that is allocated to the unique ID of the programmable lighting unit, when the computer program runs on a computer.

18. A computer program stored on a non-transitory computer storage medium comprising a program code for executing the method for operating a remote control for a programmable lighting unit, the method comprising: receiving an input of parameter data for the programmable lighting unit; and sending the parameter data to the programmable lighting unit or to multiple programmable lighting units in a radio range of the remote control, wherein the parameter data is such that a reaction by the programmable lighting unit to control data depends on the parameter data, wherein, in a log-on operation, a log-on of at least two programmable lighting units is received in radio range of the remote control, wherein a log-on operation of a programmable lighting unit comprises an ID uniquely allocated to the programmable lighting unit, wherein an own start address or an indication to a channel in a multiple-access method is allocated to every uniquely allocated ID, and wherein a signal is sent out for every received ID that comprises an ID and the start address allocated to the ID or the indication to a channel allocated to the ID in a multiple-access method, when the computer program runs on a computer.

19. A method for performing a log-on mode between a plurality of programmable lighting units and a remote control, comprising:

supplying the programmable lighting units with current;

transmitting a unique ID from every programmable lighting unit to the remote control;

receiving the unique IDs of the programmable lighting units in the remote control;

allocating an own start address or an indication to an own channel in a multiple-access method to every ID;

transmitting signals to the programmable lighting units, wherein every signal comprises a unique ID and the own start address or the indication to the own channel in a multiple-access method;

receiving several signals from the remote control by a programmable lighting unit, wherein every signal comprises a unique ID of one of the programmable lighting units and a start address allocated to the unique ID or an indication to an allocated channel allocated to the unique ID in a multiple-access method; and using only that start address as own start address or that allocated channel in a multiple-access method by a programmable lighting unit that is allocated to the unique ID of the programmable lighting unit.

20. A method for performing a log-on mode between a plurality of programmable lighting units and a remote control without using lighting unit-specific IDs, comprising:

successively turning on the programmable lighting units in a sequence, such that due to the sequence of turning on the programmable lighting units the remote control communicates only with one programmable lighting unit, wherein only always one newly turned-on programmable lighting unit is in the log-on mode;

allocating an own start address or an indication to an own channel in a multiple-access method to every programmable lighting unit;

successively transmitting signals with different start addresses or with indications to different channels in a multiple-access method by the remote control;

receiving the start address just transmitted by the remote control or the indication to an associated channel in a multiple-access method, each by the newly turned-on programmable lighting unit; and using only the received start address as own start address or the received allocated channel in a multiple-access method by the programmable lighting unit in the log-on mode.

* * * * *